United States Patent
Gavette et al.

(10) Patent No.: US 7,085,357 B2
(45) Date of Patent: Aug. 1, 2006

(54) SYSTEM AND METHOD FOR EXTERNAL VOICE MAIL NOTIFICATION BY A HOME NETWORK TELEPHONE ANSWERING DEVICE

(75) Inventors: Sherman L. Gavette, Camas, WA (US); Carl Mansfield, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 407 days.

(21) Appl. No.: 10/339,013

(22) Filed: Jan. 8, 2003

(65) Prior Publication Data
US 2003/0142798 A1    Jul. 31, 2003

Related U.S. Application Data

(63) Continuation-in-part of application No. 10/313,863, filed on Dec. 6, 2002, and a continuation-in-part of application No. 10/140,402, filed on May 6, 2002, and a continuation-in-part of application No. 10/112,909, filed on Mar. 27, 2002, now Pat. No. 6,882,714, and a continuation-in-part of application No. 10/102,245, filed on Mar. 20, 2002, and a continuation-in-part of application No. 10/066,487, filed on Jan. 31, 2002, now Pat. No. 6,693,996, and a continuation-in-part of application No. 10/066,486, filed on Jan. 31, 2002, now Pat. No. 7,023,975.

(51) Int. Cl.
   *H04M 1/64* (2006.01)
(52) U.S. Cl. .............. 379/88.12; 379/88.14; 379/93.15
(58) Field of Classification Search .......... 379/67.1, 379/88.12, 88.18, 88.22, 88.14, 88.17, 90.01, 379/93.01, 93.15, 142.14, 156, 167.01
See application file for complete search history.

(56) References Cited

U.S. PATENT DOCUMENTS

| | | | |
|---|---|---|---|
| 6,693,996 B1 * | 2/2004 | Mansfield | 379/90.01 |
| 2001/0055954 A1 | 12/2001 | Cheng | 455/74.1 |
| 2002/0031226 A1 | 3/2002 | Willis et al. | 380/255 |
| 2002/0090961 A1 | 7/2002 | Walley et al. | 455/462 |
| 2002/0123326 A1 | 9/2002 | Iyengar et al. | 455/412 |
| 2002/0168056 A1 * | 11/2002 | Binal | 379/93.09 |

FOREIGN PATENT DOCUMENTS

WO    WO 94/273394    * 11/1994

* cited by examiner

*Primary Examiner*—Scott L. Weaver
(74) *Attorney, Agent, or Firm*—David C. Ripma

(57) ABSTRACT

A system and method are provided for a Home Network telephone answering device (TAD) to notify external systems of voice mail messages. The method comprises: receiving the message from a communication media; recording a voice mail message for registered Home Network endpoints; and, sending a notification of the recorded message from the TAD to a system external to the Home Network. The notification may include information such as the calling telephone number, the calling party's name, the time of the call, the addressed endpoint, and the length of the call. Some aspects of the method further comprise: converting the format of the recorded message to one that is compatible with the external system to which the notification is sent. Other aspects of the method further comprise: in response to the notification, receiving a request for the playback of the recorded message; and, supplying the recorded message.

51 Claims, 6 Drawing Sheets

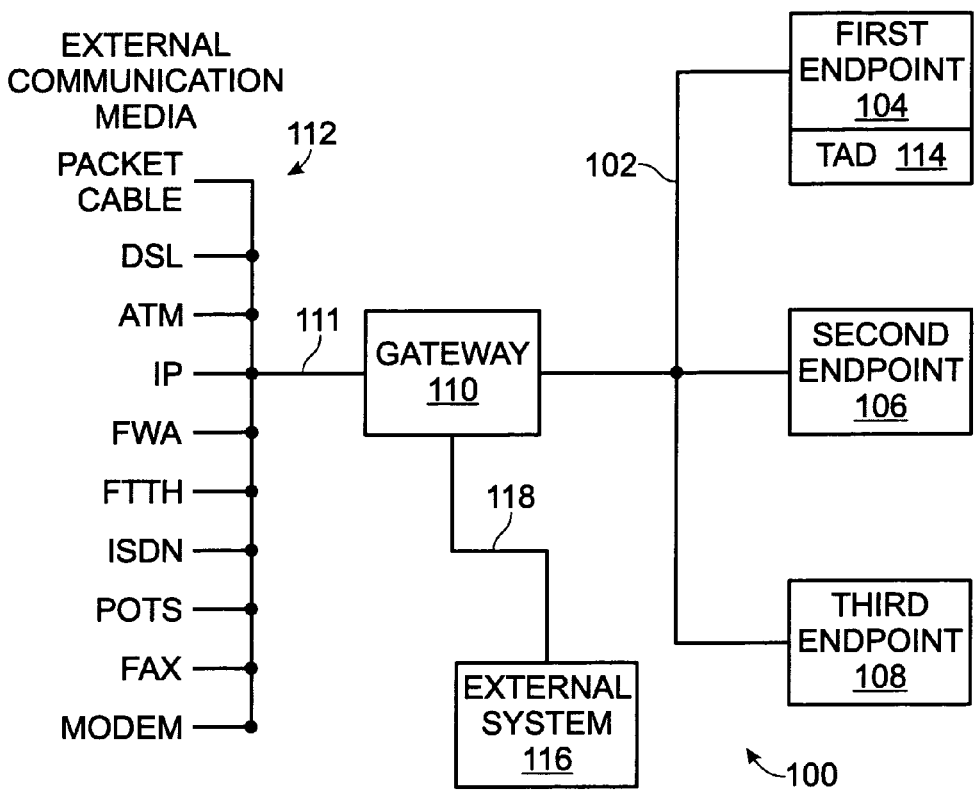

Fig. 2B

NOTIFICATION LIST FOR OFFICE PHONE

| INCOMING-LINE | EMAIL ADDRESS |
|---|---|
| 555-5555 | ADDRESS A<br>ADDRESS B |
| 555-5554 | ADDRESS B |
| 555-5553 | ADDRESS C |

DELIVERY SYSTEM NOTIFICATION LIST

| CALLER | EXTERNAL SYSTEM TO BE NOTIFIED |
|---|---|
| CALLER A | EMAIL |
| CALLER B | VOICE (LAND LINE) |
| CALLER C | WEBSITE (FTP OR HTML) |
| CALLER D | VOICE (WIRELESS) |
| CALLER E | SMS (WIRELESS OR CELLULAR) |

WIRELESS TELEPHONE NOTIFICATION LIST ⟵ 600

| HOME NETWORK ENDPOINTS | TELEPHONE NUMBER |
|---|---|
| WORK PHONE | 666-6666 |
| FAMILY PHONE EXTENSIONS | NONE |
| JUDY | 666-6665 |

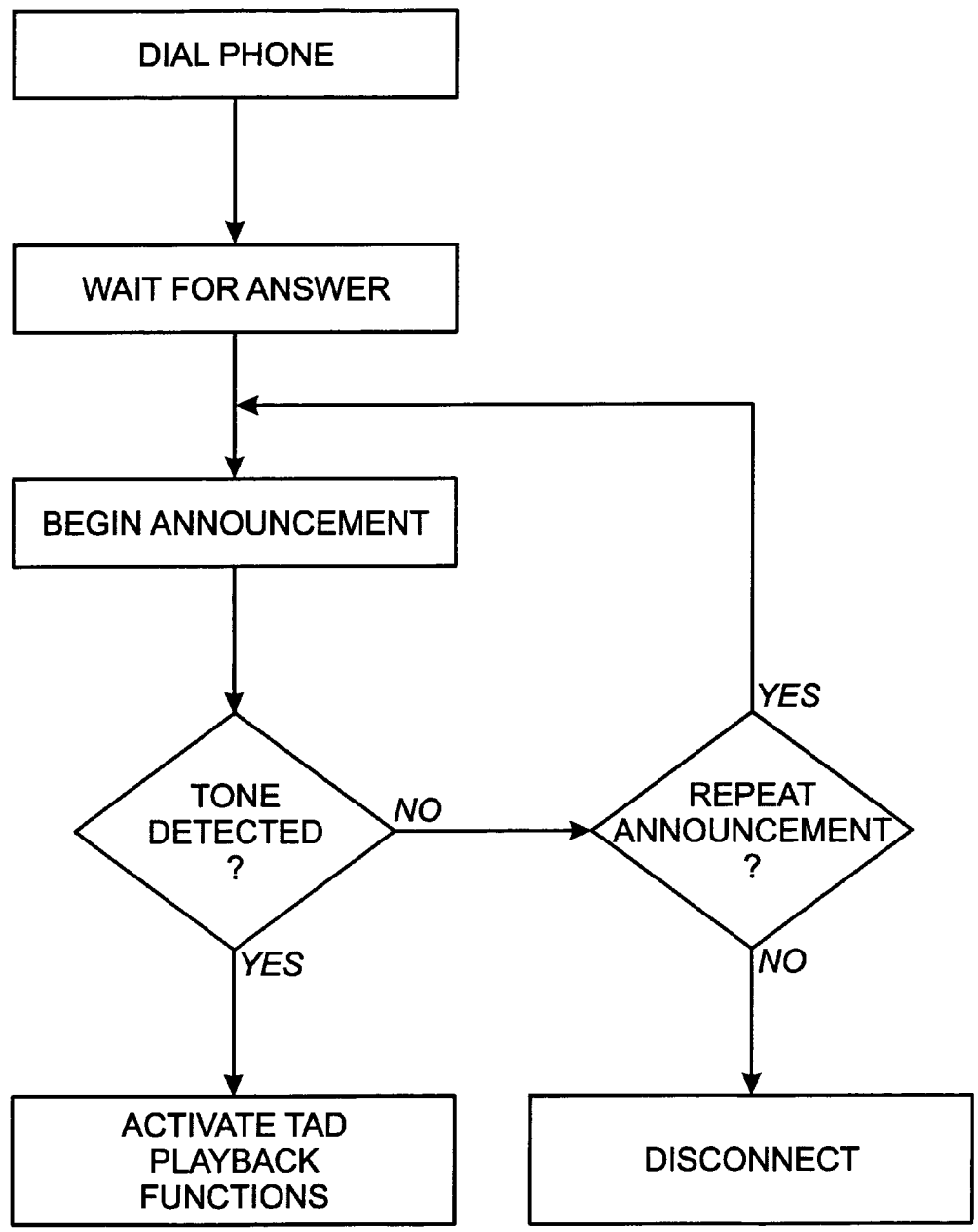

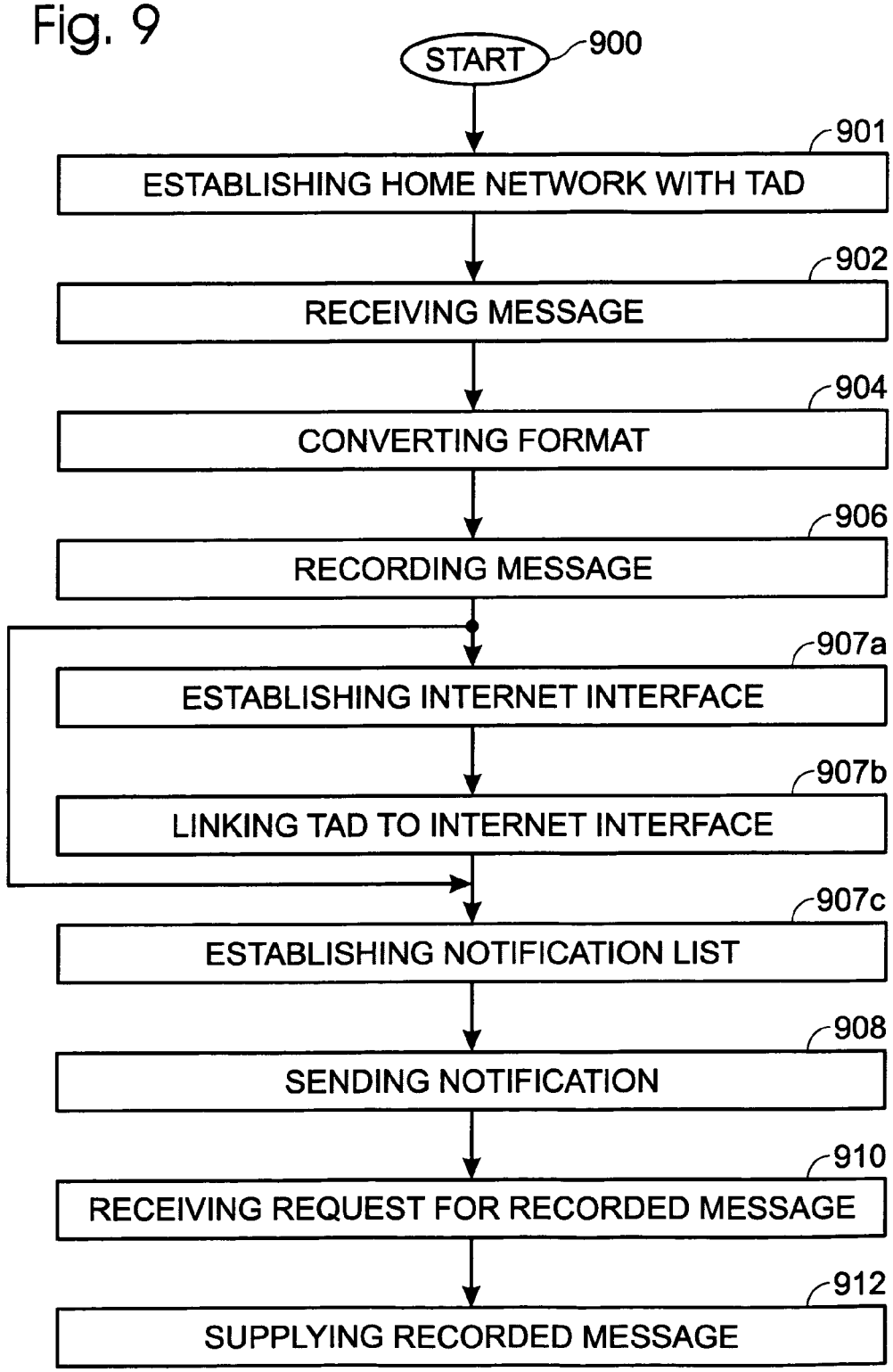

SYSTEM AND METHOD FOR EXTERNAL VOICE MAIL NOTIFICATION BY A HOME NETWORK TELEPHONE ANSWERING DEVICE

RELATED APPLICATIONS

This application is a continuation-in-part of a pending patent application entitled, PRIVACY MODE SYSTEM AND METHOD FOR HOME NETWORK TELEPHONE, invented by Mansfield et al., Ser. No. 10/066,486, filed Jan. 31, 2002 now U.S. Pat. No. 7,023,975.

This application is a continuation-in-part of a pending patent application entitled, SYSTEM AND METHOD FOR VIRTUAL MULTILINE TELPHONY IN A HOME NETWORK TELEPHONE, invented by Mansfield et al., Ser. No. 10/140,402, filed May 6, 2002.

This application is a continuation-in-part of a pending patent application entitled, SYSTEM AND METHOD FOR DATA BACKUP IN HOME NETWORK TELEPHONE, invented by Mansfield et al., Ser. No. 10/066,487, filed Jan. 31, 2002 now U.S. Pat. No. 6,693,996.

This application is a continuation-in-part of a pending patent application entitled, SYSTEM AND METHOD FOR A HOME NETWORK TELEPHONE UNIVERSAL PHONEBOOK, invented by Mansfield et al., Ser. No. 10/102,245, filed Mar. 20, 2002.

This application is a continuation-in-part of a pending patent application entitled, UNIVERSAL CALL-LOG SYSTEM AND METHOD FOR HOME NETWORK TELEPHONE, invented by Mansfield et al., Ser. No. 10/112.909, filed Mar. 27, 2002 now U.S. Pat. No. 6,882,714.

This application is a continuation-in-part of a pending patent application entitled, HOME NETWORK TELEPHONE ANSWERING SYSTEM AND METHOD FOR SAME, invented by Gavette et al., Ser. No. 10/313,863, filed Dec. 6, 2002.

BACKGROUND OF THE INVENTION

1. Field of the Invention

This invention generally relates to Home Network Telephone systems and, more particularly, to a system and method for using a telephone answering device (TAD) to notify external communication systems of received voice mail messages.

2. Description of the Related Art

Service providers are rolling out multiline, broadband telephony services using, for example, DSL, cable modem, or fixed-wireless broadband access, to carry more than one line of voice data. These carriers desire to deploy telephones that have multiline broadband telephony support in residential, small office home office (SOHO) and small and medium enterprises (SME) environments that subscribe to these broadband telephony services.

In current multiline integrated services digital network (ISDN) or plain old telephone service (POTS) telephones, all of the available external telephone lines terminate at the telephone itself. This allows for easy switching between lines, line selection, indications of line status, control of line-hold, and multiparty conferencing capabilities. The majority of current POTS multiline telephones limit the number of lines supported to two. Typical residential POTS wiring comprise two pairs and can readily support up to two lines, but no more. In current multiline telephones, although all the supported lines terminate at the multiline phone itself, typically only one voice stream is active in a telephone call at any given time, since the multiline phone typically has only one mouthpiece and earpiece.

Home Network telephony systems are emerging that support multiple internally connected home network telephony devices such as telephones, fax machines, and multi-functional peripherals (MFPs). Typically, such Home Network telephone devices share a digital home network transmission media, such as a standard phoneline, an AC powerline, dedicated hardwires (such as Ethernet), or a wireless channel. Telephony adapters exist that allow a legacy analog phone to plug into and use digital home network telephony. Likewise, integrated telephony devices are emerging that directly incorporate the digital home network telephony interface.

However, conventional home network telephony devices and adapters support only one audio path (channel) across the home network. This limitation is highly desirable for low cost service. However, conventional multiline telephony systems require that all the telephone lines that are available at an endpoint, be physically terminated at that endpoint, and support multiple simultaneous audio paths (one per telephone line) to the multiline endpoint.

Several conventional residential and SOHO telephones are able to list the calls that are made (originated), as well as incoming calls that are either answered or missed. In the latter case, this call-log is only useful if calling line ID (CLID) is supported since, without CLID, the call-log cannot identify the number of the caller. Often, call-logs are cross-referenced with phonebook entries, so that the call-log can show a more meaningful ASCII name, herein referred to as a descriptor, to identify the caller, rather than just the number. Likewise, a number in a call-log can typically be saved directly into a phonebook, with the user only needing to type the ASCII name.

It would be advantageous if external communication systems could be notified of the existence of voice mail messages that have been received by a Home Network telephone system.

It would be advantageous if the Home Network telephone system could relay recorded voice mail messages to addresses in an external system.

SUMMARY OF THE INVENTION

The present invention describes a system and method for a Home Network telephone system to notify an external communications system of received voice mail messages. In some aspects, the Home Network sends the recorded voice mail message to an external system address.

Accordingly, a method is provided for a Home Network telephone answering device (TAD) to notify external systems of voice mail messages. The method comprises: receiving a message from a communication medium such as voice over Packet Cable, DSL, ATM, Internet Protocol (IP), fixed wireless access (FWA), fibre to the home (FTTH), integrated services digital network (ISDN), plain old telephone service (POTS), facsimile (FAX), or modems; recording the voice mail message on a Home Network TAD for registered Home Network endpoints; and, sending a notification of the recorded message from the TAD to a system external to the Home Network, such as email, Internet website, external telephones, external personal computers (PCs), personal data assistants (PDAs), and wireless telephone short message service (SMS) systems. The notification may include information such as the calling telephone number, the calling party's name, the time of the call, the addressed endpoint, and the length of the call. Some aspects of the method further comprise: converting the format of the recorded message to one that is compatible with the external system to which the notification is sent. Other aspects of the method further comprise: in response to the notification, receiving a request for the recorded message; and, supplying the recorded message.

For example, in some aspects the method comprises: establishing an Internet interface; establishing a linkage between the TAD and the Internet interface. Then, sending a notification of the recorded message from the TAD to a system external to the Home Network includes sending an email notification via the Internet interface.

In other aspects, the method comprises: establishing a Home Network telephone system including a plurality of Home Network (HN) endpoints registered with the TAD; establishing a notification list cross-referencing email addresses with HN endpoints. Then, recording a voice mail message on a Home Network TAD includes recording a message addressed to a first HN line, and sending an email notification via the Internet interface includes sending an email notification to an email address cross-referenced to the first HN endpoint. Alternately, the notification can be sent in response to a list that cross-references incoming (sourcing) telephone lines to notification addresses.

Additional aspects of the above-described method and a system for a Home Network telephone answering device (TAD) to notify external systems of voice mail messages are provided below.

BRIEF DESCRIPTION OF THE DRAWINGS

FIG. 1 is a schematic block diagram of the present invention system for a Home Network telephone answering device (TAD) to notify external systems of voice mail messages.

FIG. 2a is a diagram illustrating an endpoint-triggered detail of the TAD of FIG. 1.

FIG. 2b is a diagram illustrating an incoming line-triggered detail of the TAD of FIG. 1.

FIG. 3 is a diagram illustrating an external system notification list detail of the TAD of FIG. 1.

FIG. 8 is a flowchart illustrating an exemplary notification algorithm of the present invention.

FIG. 9 is a flowchart illustrating the present invention method for a Home Network telephone answering device (TAD) to notify external systems of voice mail messages.

DETAILED DESCRIPTION OF THE PREFERRED EMBODIMENTS

Figure 4:
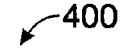
FIG. 4 is a diagram illustrating a website notification list detail of the TAD of FIG. 1.

FIG. 1 is a schematic block diagram of the present invention system for a Home Network telephone answering device (TAD) to notify external systems of voice mail messages. The system 100 comprises at least one HN endpoint having a port on line 102 to transceive Home Network telephone communications. The system 100 may include a number of external system lines, such as telephone lines, which correspond to telephone numbers. For example, the system 100 may accept calls on three different lines (telephone numbers): a work line, a personal line for the family, and a line for "Judy".

Shown are three endpoints, first endpoint 104, second endpoint 106, and third endpoint 108, which all transceive telephone communications. However, it should be understood that the system 100 is not limited to any particular number of telephone lines or endpoints. It should also be noted that a telephone line need not necessarily be connected (mapped) to a particular endpoint for a call to be received or recorded. It should also be noted that endpoints share the same channel, which is represented by line 102, and may be an Ethernet, AC powerline, or wireless communication channel, to name but a few examples. A gateway 110 has a port on line 102 to transceive telephone communication between the at least one endpoint and an external communication media 112. The gateway 110 receives messages on line 111 from a communication medium 112 such as Packet Cable, DSL, ATM, Internet Protocol (IP), fixed wireless access (FWA), fibre to the home (FTTH), integrated services digital network (ISDN), plain old telephone service (POTS), facsimile (FAX), or modems. For simplicity, the communication medium is typically assumed to be, and is typically referred to herein as telephone lines or numbers.

A Home Network TAD 114 has a port connected on line 102 to accept and record voice mail messages received for registered HN endpoints, and to send notification of the recorded message, via the gateway 110, to a system 116 external to the Home Network. In some aspects of the system, an endpoint to automatically registered when connected to the system. In other aspects, an endpoint becomes registered after external system notification instructions are completed. Note that the TAD 114 is shown as an element of the first endpoint 104. In other aspects of the system 100 not shown, the TAD can be a stand-alone element or it may be part of the gateway 110.

The TAD 114 sends notification to an external system 116 such as email, Internet website, external telephones, external personal computers (PCs), personal data assistants (PDAs), wireless telephone short message service (SMS) systems, or wireless telephone text messaging services. As explained in more detail below, there may be overlap between the external systems 116 and the communication media 112. That is, the external system 116 is a communication medium 112 in some aspects of the invention. However, the communication media 112 and external systems 116 are shown differentiated in the figure for clarity.

Typically, the TAD 114 records the message in a format responsive to the communication medium 112 supplying the message. Then, the TAD 114 converts the format of the recorded message to one that is compatible with the external system 116 to which the notification is sent. The TAD 114 may send information such as the calling telephone number, the calling party's name, the time of the call, the addressed endpoint, or the length of the call.

For example, in one aspect of the system 100, the gateway 110 establishes a linkage on line 118 between an Internet interface and the TAD 114, and sends a notification of the recorded message via the Internet interface. Although shown connected with a separate line (line 118), in some aspects of the invention the external system 116 is connected to the gateway 110 (and to the TAD 114) via an external communication medium 112.

FIG. 2a is a diagram illustrating an endpoint-triggered detail of the TAD of FIG. 1. A plurality of Home Network endpoints, for example the work phone, family phone extensions, and a personal line (Judy) endpoint are registered with the TAD. It should be noted that each endpoint may be distinguished by a unique address. However, one or more external system (telephone) lines may be mapped to the same endpoint. The TAD is shown with a notification list 200, which may be enabled in a memory for example. The memory may be in the TAD, in an endpoint distinct from the TAD, or even in the gateway. The notification list 200 cross-references email addresses with HN endpoints. That is, the TAD sends an email notification to an email address in response to cross-referencing an HN endpoint. For example, in response to receiving a voice mail message addressed to the work phone, the TAD sends a notification message to a first email address (address A). In some aspects, the TAD sends the recorded message as an email attachment. If so, the TAD may convert the recorded message attachment to an email compatible format. Alternately, the TAD may convert the recorded voice mail message to a text message.

FIG. 2b is a diagram illustrating an incoming line-triggered detail of the TAD of FIG. 1. For example, in response to receiving a call (from an external system) on line 555-5555 addressed to the HN office phone, the system selects an email address to which a notification message is sent. It should be noted that it may be possible to send the notification to two different email addresses, as shown.

FIG. 3 is a diagram illustrating an external system notification list detail of the TAD of FIG. 1. The list cross-references the caller (or external system telephone number) to the notification means. Alternately but not shown, the list may cross-reference to addressed endpoint to notification means. As above, HN endpoints are registered with the TAD. Note that not all endpoints in the system necessarily receive TAD services. The type of notification delivery is shown cross-referenced to caller. Email, voice (landline and wireless), website, and SMS delivery systems are shown as examples.

Further, depending on endpoint capabilities and user-selected options, not all endpoints in the system necessarily receive the same kind or level of TAD services. As shown, the TAD includes a notification list 300 cross-referencing external systems to be notified with callers. That is, the TAD selects an external system to notify in response to cross-referencing the caller. For example, in response to receiving a voice mail from a first caller (caller A), the TAD, responding to the notification list 300, may send a notification via email. Naturally, an email address would be required. Alternately but not shown, the list 300 may cross-reference the external system to be notifies with (addressed) endpoints. Note that in some aspects of the system, the TAD would include both the notification list of FIG. 2a and FIG. 2b, as well as notification list 300. For example, in response to receiving a voice mail from a first caller (caller A), an email notification means is selected (see FIG. 3). In response to the call being addressed to the work phone, the notification is sent to email address A (see FIG. 2a).

Returning to FIG. 1, in some aspects of the system 100, the gateway 110 establishes a linkage on line 118 between an Internet interface and the TAD 114. Then, the TAD 114 sends a website notification via the Internet interface as an entry such as a file transport protocol (FTP), HTTP, SHTTP, or custom protocol.

FIG. 4 is a diagram illustrating a website notification list detail of the TAD of FIG. 1. As above, three HN endpoints are registered with the TAD. Then, the TAD includes a notification list 400 cross-referencing website addresses with HN endpoints. That is, the TAD sends website notifications via the Internet interface in response to cross-referencing HN endpoints. For example, the TAD may send a notification to website C in response to receiving a voice mail addressed to the family phone extensions. Alternately but not shown, the website to be notified is cross-referenced to incoming (sourcing) telephone lines.

Returning to FIG. 1, in some aspects the TAD 114 has an address and the TAD 114 (or TAD in conjunction with the gateway 110) creates a hypertext link to the TAD address, so that replies can be received, requesting the playback of the recorded message that is the subject of the notification. As above, the TAD 114 may convert the recorded message into a format such as MP3, WAV, WMA, or RA to name a few examples. In other aspects, the TAD 114 converts the recorded voice mail message to a text message attachment. Note that in some aspects of the system, the TAD 114 could include aspects of the notification lists of FIGS. 2a, 2b, and 3, as well as notification list 400. For example, in response to receiving a call from caller C (see FIG. 3), website notification is selected. In response to the call being addressed to the family phone extensions, website C is selected.

In some aspects of the system 100, the gateway 110 interfaces an external telephone line communication medium 112, and the TAD 114 sends a voice-announcement via the gateway 110 to an external telephone number.

Figure 5:
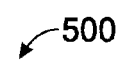
FIG. 5 is a diagram illustrating an external (landline) telephone number notification list detail of the TAD of FIG. 1.

FIG. 5 is a diagram illustrating an external (landline) telephone number notification list detail of the TAD of FIG. 1. As above, three HN endpoints are registered with the TAD. The TAD includes a notification list 500 cross-referencing external telephone numbers with HN endpoints. That is, the TAD sends voice-announcements to external telephone numbers in response to cross-referencing HN endpoints. For example, the TAD may send a voice-announcement to telephone number "555-5555" in response to a voice mail being addressed to the work phone. Alternately but not shown, the external telephone number to be notified can be cross-referenced to incoming telephone lines sourcing the call. In some aspects, the TAD accepts dual tone multi-frequency (DTMF) signals for requesting playback of a recorded message. External communication medium digital phone systems offer a greater variation in notification and playback request options. Regardless of the external system telephone format, it is typical that the TAD, or possibly the gateway, converts the recorded message to an external telephone compatible format. Note that in some aspects of the system, the TAD would include aspects of the notification lists of FIGS. 2a, 2b, 3, and 4, as well as notification list 500.

Returning to FIG. 1, in some aspects of the system 100, the gateway 110 may interface to a wireless telephone type of external system 116. Then, the linkage 118 between the gateway 110 and the external system could be a wireless channel. However, in other aspects the wireless telephone system can be considered a communication medium 112 that is connected to the gateway on line 111. Regardless, the TAD 114 may send voice messages via the gateway 110 to wireless telephone numbers. It should be noted that SMS or other text messages are typically sent via a web client.

Figures 6, 7:
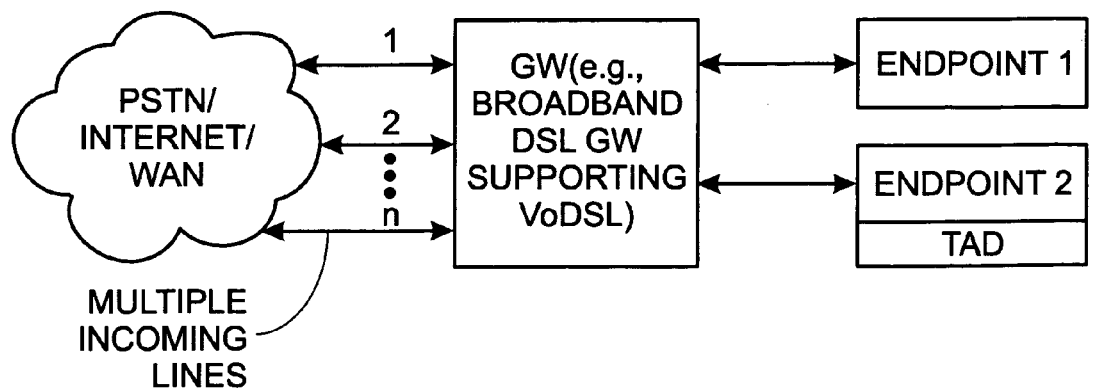
FIG. 6 is a diagram illustrating a wireless telephone notification list detail of the TAD of FIG. 1.
FIG. 7 is a schematic block diagram illustrating a simple voice network with multiple incoming lines and two endpoints (extensions).

FIG. 6 is a diagram illustrating a wireless telephone notification list detail of the TAD of FIG. 1. As above, a plurality of Home Network endpoints are registered with the TAD. The TAD includes a notification list 600 cross-referencing wireless telephone numbers with HN endpoints. That is, the TAD sends wireless telephone text messages to wireless telephone numbers in response to cross-referencing HN endpoints. For example, the TAD may send a notification to wireless telephone number "666-6666" in response to receiving a voice mail addressed to the work phone. Alternately but not shown, the wireless telephone number to be notified can be cross-referenced to incoming telephone lines sourcing the call.

Generally, the TAD converts the recorded message to a wireless telephone compatible format. In some aspects, the TAD records an audio voice message, converts the audio voice message to a text message, and sends the converted text message. In other aspects, the TAD may accept DTMF signals for requesting playback of the recorded message. Note that in some aspects of the system, the TAD would include aspects of the notification lists of FIGS. 2a, 2b, 3, 4, and 5, as well as notification list 600.

Functional Description

The present invention is embedded in a Home Network, or network within a SOHO or business, that supports digital voice telephony, multiple incoming lines (digital, analog or a combination thereof), multiple extensions, and the capability of bridging two or more extensions onto a single call. A call arrives from outside the Home Network from a communication medium using a voice over broadband (VoBB) protocol, for example, and is likely to be distributed in the Home Network using a different protocol, such as a Voice over Home Network (VoHN) protocol.

An integrated telephone answering device (TAD) associated with the Home Network and supports the basic functionality described above. In some aspects of the invention the TAD captures voice in the VoHN's native format, for example 64K PCM.

FIG. 7 is a schematic block diagram illustrating a simple voice network with multiple incoming lines and two endpoints (extensions). The invention makes use of out-of-band messaging, which exists in most modern telephony systems, and of the switching and bridging capabilities of the Gateway.

E-Mail Notification

If the gateway supports an email client, then the TAD can use the email service to notify the user of the arrival of new messages. The TAD provides a means for the user to specify a list of email addresses to which notification is to be sent when a new message arrives. The list of email addresses may be different for each incoming line. If the email notification feature is active, the TAD formats and sends an email addressed to the appropriate email list whenever a new voice mail message has been received.

The subject and body of the notification message may contain such information as the time of the call, the line it came in on, the CLID of the calling party, and the length of the message. The voice message itself could also be included in an attachment to the email. In some aspects, the voice message is reformatted from the native format of the telephones' protocol to a common format playable on PCs, such as MP3 or WAV. It is also possible that the reformatting could be a voice-to-text conversion. In other aspects of the invention, the user is able to configure features such as which items are included in the subject line and body of the message, and is able to select the target format for the voice message.

In some aspects, the reformatting of the voice mail can be an additional-premium option. In this case, if the user elects not to subscribe to the option, then the notification could be presented without the voice mail attachment and the user would have to dial into their Home Network and retrieve the messages directly from the TAD.

Web-Based Notification

If the gateway supports a web client and the user has configured a website, then the TAD can post the incoming messages to a user-specified web page. Typically, the user would control access to the page with a security means such as a password. This control need not necessarily be a function associated with the TAD.

If the web-based notification feature is active, the TAD posts the message list to the specified web page as an HTML entry. A web page entry can be made in response to changes, for example, in response to new messages or deletions. One option is to display the information in the format shown in Table 1. The user may be able to change the sort order of the list or make other simple formatting changes.

TABLE 1

Sample Message Notification Display

| Incoming Line | CLID | Time | Msg. Length | State |
|---|---|---|---|---|
| 1 | 800-555-1212 | 8/10 @ 12:00 P | 30 sec | New |
| 2 | 800-555-1212 | 8/10 @ 10:00 A | 60 sec | New |
| 2 | 800-555-9111 | 8/09 @ 1:30 P | 45 sec | Saved |

There can be a link to the voice mail so that the user accessing the web page can request playback of the voice mail message. This may require the additional-premium reformatting described above.

FIG. 8 is a flowchart illustrating an exemplary notification algorithm of the present invention. If the Phone/Voice mail Notification feature is active, the TAD dials the user-specified number. When the phone is answered, it will present a user-defined announcement of the new message.

If the user answers the phone and presses a user-defined key during the announcement, for example the # key, the TAD recognizes the key press and provides the user with all the functions the user would have if the user had dialed into the TAD and activated the remote playback feature. A user authentication feature could be activated at this point in the process.

If the TAD does not detect the key press, it repeats the announcement a user-defined number of times (defaulting to one repeat). If the specified key press is not detected by the time the announcement has completed all the repeats, the TAD disconnects the call.

The present invention TAD system permits a user to adapt the TAD to operate with an external phone service so that the TAD's announcement can be captured by the external answering service if the user is unable to answer the called phone at the time of the call. For some external phone systems, the TAD must be able to recognize in-band signaling (DTMF signals). Generally, the TAD can be configured to recognize any interfacing external phone or communication system.

Short Message Notification

If the user subscribes to a phone service that supports a Short Messaging Service, for example GEM's SMS, the TAD sends a short message to the user's phone alerting the user to the arrival of a new voice mail. This type of notification can be used in conjunction with the web-based notification service or email notification service, alerting the user to check the Web Page. Alternatively, this type of notification can be used independently. When the user receives the Short Message, the user can dial into the TAD and access the messages. Note, that the TAD notification service can potentially be used with any type of wireless protocol.

FIG. 9 is a flowchart illustrating the present invention method for a Home Network telephone answering device (TAD) to notify external systems of voice mail messages. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 900.

Step 901 establishes a Home Network telephone system including at least one Home Network endpoint registered with a TAD. Step 902 receives the message from a communication medium such as Packet Cable, DSL, ATM, Internet Protocol (IP), fixed wireless access (FWA), fibre to the home (FTTH), integrated services digital network (ISDN), plain old telephone service (POTS), facsimile (FAX), or modems. Step 904 converts the format of the recorded message to one that is compatible with the external system to which the notification is sent.

Step 906 records a voice mail message on the Home Network TAD, for registered Home Network endpoints. In some aspects, recording a voice mail message on a Home Network TAD includes recording the message in a format selected from the group including a Home Network native format, G.711, G.722, G.723, G.728, G.729, G.729a, ADPCM, GSM06.10, GSM 06.20, GSM-EFR, TETRA, IS54 TDMA, CDMA, JDC1, JDC2, DOD FS1015, or DOD FS1016. The above-mentioned formats are related to CODECs that convert between analog and digital signals. In a communication link there is a COding/DECoding device on each end. The G.nnn formats relate to ITU CODECs, the GSM.xxx are defined by ETSI for GSM, and the DOD CODECs are defined by the Department of Defense. In other aspects, Step 906 records the message in a format responsive to the communication medium supplying the message.

Step 908 sends a notification of the recorded message from the TAD to a system external to the Home Network. In some aspects, sending a notification of the recorded message from the TAD to a system external to the Home Network includes sending notification to an external system such as email, Internet website, external telephones, external personal computers (PCs), personal data assistants (PDAs), wireless telephone short message service (SMS) systems, or wireless telephone text messaging services. In some aspects of the method, sending a notification of a recorded message in Step 908 includes sending information such as the calling telephone number, the calling party's name, the time of the call, the addressed endpoint, or the length of the call. Step 910 receives a request for a playback of the recorded message in response to the notification. Step 912 supplies the recorded message.

Some aspects of the method include further steps. Step 907a establishes an Internet interface. Step 907b establishes a linkage between the TAD and the Internet interface. Then, sending a notification of the recorded message from the TAD to a system external to the Home Network in Step 908 includes sending an email notification via the Internet interface.

In other aspects, Step 907c establishes a notification list cross-referencing email addresses with HN endpoints. Alternately, the email addresses to be notified can be cross-referenced to incoming telephone lines sourcing the call. Recording a voice mail message on a Home Network TAD in Step 906 includes recording a message addressed to a first HN endpoint, for example. Then, sending an email notification via the Internet interface in Step 908 includes sending an email notification to an email address cross-referenced to the first HN endpoint. In some aspects, Step 908 sends the recorded message as an email attachment. In other aspects, Step 904 converts the recorded message attachment to an email compatible format. Alternately, Step 904 converts the recorded voice mail message to a text message.

In alternate aspects of the invention, sending a notification of the recorded message from the TAD to a system external to the Home Network in Step 908 includes sending a website notification via the Internet interface as an entry selected from the group including FTP, HTTP, and SHTTP entries. Then, Step 907c would establish a notification list cross-referencing website addresses with HN endpoints. Alternately, the websites to be notified can be cross-referenced to incoming telephone lines sourcing the call. Recording a voice mail message on a Home Network TAD in Step 906 would include recording a message addressed to a first HN endpoint, for example. Then, sending a website notification via the Internet interface in Step 908 includes sending a notification to the website cross-referenced to the first HN endpoint.

In some aspects, sending a website notification via the Internet interface in Step 908 includes creating a hypertext link to the TAD for requesting playback of the recorded message. In other aspects, Step 904 converts to a format such as MP3, WAV, WMA, or RA formats (for example). Alternately, Step 904 converts the recorded voice mail message to a text message attachment.

In some aspects of the method, establishing a Home Network telephone system with a plurality of Home Network endpoints registered with the TAD (Step 901) includes interfacing the gateway to external telephone lines. Then, sending a notification of the recorded message from the TAD to a system external to the Home Network in Step 908 includes sending a voice-announcement via the gateway to an external telephone number.

In some aspects, Step 907c establishes a notification list cross-referencing external telephone numbers with HN endpoints. Alternately, the telephone numbers to be notified can be cross-referenced to incoming telephone lines sourcing the call. Recording a voice mail message on a Home Network TAD in Step 906 includes recording a message addressed to a first HN endpoint, for example. Then, sending a voice-announcement via the gateway to an external telephone number in Step 908 includes sending an announcement to an external telephone number cross-referenced to the first HN endpoint. In some aspects, Step 910 accepts dual tone multi-frequency (DTMF) signals for requesting playback of the recorded message. In other aspects, Step 904 converts the recorded message to an external telephone compatible format.

In some aspects of the method, Step 907c establishes a notification list cross-referencing external systems to be notified (including particular notification addresses), with callers. Alternately, the external system to be notified can be cross-referenced to addressed endpoints. Recording a voice mail message on a Home Network TAD in Step 906 includes recording a message received from a first caller, for example. Then, sending a voice-announcement via the gateway to an external telephone number in Step 908 includes sending an announcement to a first external system cross-referenced to the first caller.

In other aspects of the system, sending a notification of the recorded message from the TAD to a system external to the Home Network in Step 908 includes sending a wireless telephone text message via the gateway to a wireless telephone number. Then, Step 907c may establish a notification list cross-referencing wireless telephone numbers with HN endpoints. Alternately, the wireless telephone number to be notified can be cross-referenced to incoming telephone lines sourcing the call. Recording a voice mail message on a Home Network TAD in Step 906 would include recording a message addressed to a first HN endpoint, for example. Then, sending a wireless telephone text message via the gateway to a wireless telephone number in Step 908 includes sending a text message to a wireless telephone number cross-referenced to the first HN endpoint.

In some aspects, Step 904 converts the recorded message to a wireless telephone compatible format. In other aspects, recording a voice mail message on a Home Network TAD in Step 906 includes recording an audio voice message. Step 904 converts the audio voice message to a text message, and Step 908 sends the converted text message. Step 910 may accept DTMF signals for requesting playback of the recorded message.

In some aspects of the method, establishing a Home Network system in Step 901 includes establishing a notification list cross-referencing notification addresses (the external system to be notified and/or particular addresses) with incoming telephone numbers (external system telephone lines). Then, sending a notification of the recorded message from the TAD to a system external to the Home Network in Step 908 includes sending a notification in response to the incoming telephone number.

A system and method have been provided for using a TAD to notify external systems of Home Network voice mail messages. Examples have been provided of some specific embodiments of the invention. Likewise, examples have been given of TAD notification purposes and uses. However, the invention is not limited to merely these examples. Other variations and embodiments of the invention will occur to those skilled in the art.

We claim:

1. A method for a Home Network telephone answering device (TAD) to notify external systems of voice mail messages, the method comprising:
   recording a voice mail message on a Home Network TAD, for registered Home Network endpoints;
   converting the format of the recorded message to one that is compatible with an external system to which a notification is to be sent; and,
   sending the notification of the recorded message from the TAD to the system external to the Home Network.

2. The method of claim 1 wherein recording a voice mail message on a Home Network TAD includes recording the message in a format selected from the group including a Home Network native format, G.711, G.722, G.723, G.728, G.729, G.729a, ADPCM, GSM06.10, GSM 06.20, GSM-EFR, TETRA, IS54 TDMA, CDMA, JDC1, JDC2, DOD FS1015, and DOD FS1016.

3. The method of claim 1 wherein sending a notification of the recorded message from the TAD to a system external to the Home Network includes sending notification to an external system selected from the group including email, Internet website, external telephones, external personal computers (PCs), personal data assistants (PDAs), wireless telephone short message service (SMS) systems, and wireless telephone text messaging services.

4. The method of claim 3 further comprising:
   receiving the message from a communication medium selected from the group including Packet Cable, DSL, ATM, Internet Protocol (IP), fixed wireless access (FWA), fibre to the home (FTTH), integrated services digital network (ISDN), plain old telephone service (POTS), facsimile (FAX), and modems; and,
   wherein recording a voice mail message on a Home Network TAD includes recording the message in a format responsive to the communication medium supplying the message.

5. The method of claim 1 wherein sending the notification of the recorded message includes sending information selected from the group including the calling telephone number, the calling party's name, the time of the call, the addressed endpoint, and the length of the call.

6. The method of claim 5 further comprising:
   in response to the notification, receiving a request for the playback of a recorded message; and,
   supplying the recorded message.

7. The method of claim 5 further comprising:
   establishing an Internet interface;
   establishing a linkage between the TAD and the Internet interface; and,
   wherein sending a notification of the recorded message from the TAD to a system external to the Home Network includes sending an email notification via the Internet interface.

8. The method of claim 7 further comprising:
   establishing a Home Network telephone system including a plurality of Home Network endpoints registered with the TAD;
   establishing a notification list cross-referencing email addresses with HN endpoints;
   wherein recording a voice mail message on a Home Network TAD includes recording a message addressed to a first HN endpoint; and,
   wherein sending an email notification via the Internet interface includes sending an email notification to an email address cross-referenced to the first HN endpoint.

9. The method of claim 7 wherein sending an email notification via the Internet interface includes sending the recorded message as an email attachment.

10. The method of claim 9 wherein converting the format of the recorded message includes converting the recorded message attachment to an email compatible format.

11. The method of claim 10 wherein converting the recorded message attachment to an email compatible format includes converting the recorded voice mail message to a text message.

12. The method of claim 5 further comprising:
    establishing an Internet interface;
    establishing a linkage between the TAD and the Internet interface; and,
    wherein sending a notification of the recorded message from the TAD to a system external to the Home Network includes sending a website notification via the Internet interface as an entry selected from the group including file transfer protocol (FTP), HTTP, and SHTTP entries.

13. The method of claim 12 further comprising:
    establishing a Home Network telephone system including a plurality of Home Network endpoints registered with the TAD;
    establishing a notification list cross-referencing website addresses with HN endpoints;
    wherein recording a voice mail message on a Home Network TAD includes recording a message addressed to a first HN endpoint; and, wherein sending a website notification via the Internet interface includes sending a notification to the website cross-referenced to the first HN endpoint.

14. The method of claim 12 wherein sending a website notification via the Internet interface includes creating a hypertext link to the TAD for requesting playback of the recorded message.

15. The method of claim 14 wherein converting the format of the recorded message to one that is compatible with the external system to which the notification is sent includes converting to a format selected from the group including MP3, WAV, WMA, and RA formats.

16. The method of claim 14 wherein converting the recorded message includes converting the recorded voice mail message to a text message attachment.

17. The method of claim 5 further comprising:
establishing an Home Network telephone system with a gateway interfacing the TAD to external telephone lines; and,
wherein sending the notification of the recorded message from the TAD to the system external to the Home Network includes sending a voice-announcement via the gateway to an external telephone number.

18. The method of claim 17 further comprising:
establishing a Home Network telephone system including a plurality of Home Network endpoints registered with the TAD;
establishing a notification list cross-referencing external telephone numbers with HN endpoints;
wherein recording a voice mail message on a Home Network TAD includes recording a message addressed to a first HN endpoint; and,
wherein sending a voice-announcement via the gateway to an external telephone number includes sending an announcement to an external telephone number cross-referenced to the first HN endpoint.

19. The method of claim 17 further comprising:
accepting dual tone multi-frequency (DTMF) signals for requesting playback of the recorded message.

20. The method of claim 17 wherein converting the format of the recorded message includes converting the recorded message to an external telephone compatible format.

21. The method of claim 17 further comprising:
establishing a notification list cross-referencing external systems to be notified, with callers;
wherein recording a voice mail message on a Home Network TAD includes recording a message received from a first caller; and,
wherein sending a voice-announcement via the gateway to an external telephone number includes sending an announcement to a first external system cross-referenced to the first caller.

22. The method of claim 5 further comprising:
establishing a Home Network telephone system with a gateway interfacing the TAD to a wireless telephone system; and,
wherein sending the notification of the recorded message from the TAD to the system external to the Home Network includes sending a wireless telephone text message via the gateway to a wireless telephone number.

23. The method of claim 22 further comprising:
establishing a Home Network telephone system including a plurality of Home Network endpoints registered with the TAD;

establishing a notification list cross-referencing wireless telephone numbers with HN endpoints;
wherein recording a voice mail message on a Home Network TAD includes recording a message addressed to a first HN endpoint; and,
wherein sending a wireless telephone text message via the gateway to a wireless telephone number includes sending a text message to a wireless telephone number cross-referenced to the first HN endpoint.

24. The method of claim 23 wherein recording a voice mail message on a Home Network TAD includes recording an audio voice message;
wherein converting the format of the recorded message includes converting the audio voice message to a text message; and,
wherein sending a wireless telephone text message via the gateway to a wireless telephone number includes sending the converted text message.

25. The method of claim 22 further comprising:
accepting dual tone multi-frequency (DTMF) signals for requesting playback of the recorded message.

26. The method of claim 21 wherein converting the format of the recorded message includes converting the recorded message to a wireless telephone compatible format.

27. A system for a Home Network telephone answering device (TAD) to notify external systems of voice mail messages, the system comprising:
at least one Home Network (HN) endpoint for transceiving Home Network telephone communications;
a gateway having a port to transceive telephone communications between the at least one endpoint and an external communication media; and,
a Home Network TAD having a port connected to accept and record voice mail messages addressed to registered HN endpoints, to convert the format of the recorded message to one that is compatible with an external system to which a notification is to be sent, and to send notification of the recorded message, via the gateway, to the system external to the Home Network.

28. The system of claim 27 wherein the TAD sends notification to an external system selected from the group including email, Internet website, external telephones, external personal computers (PCs), personal data assistants (PDAs), wireless telephone short message service (SMS) systems, and wireless telephone text messaging services.

29. The system of claim 28 wherein the gateway receives messages from a communication medium selected from the group including Packet Cable, DSL, ATM, Internet Protocol (IP), fixed wireless access (FWA), fibre to the home (FTTH), integrated services digital network (ISDN), plain old telephone service (POTS), facsimile (FAX), and modems; and,
wherein the TAD records the message in a format responsive to the communication medium supplying the message.

30. The system of claim 27 wherein the TAD sends information selected from the group including the calling number, the calling party's name the time of the call the addressed endpoint, and the length of the call.

31. The system of claim 30 wherein the gateway establishes a linkage between an Internet interface and the TAD; and,
wherein the TAD sends a notification of the recorded message via the Internet interface.

32. The system of claim 31 further comprising:
a plurality of Home Network endpoints registered with the TAD;

wherein the TAD includes a notification list cross-referencing email addresses with HN endpoints, the TAD sending an email notification to an email address in response to cross-referencing an HN endpoint.

33. The system of claim 31 wherein the TAD sends the recorded message as an email attachment.

34. The system of claim 33 wherein the TAD converts the recorded message attachment to an email compatible format.

35. The system of claim 34 wherein the TAD converts the recorded voice mail message to a text message.

36. The system of claim 31 wherein the TAD includes a notification list cross-referencing external systems to be notified with callers, the TAD selecting the external system notification in response to cross-referencing the caller.

37. The system of claim 30 wherein the gateway establishes a linkage between an Internet interface and the TAD; and,
wherein the TAD sends a website notification via the Internet interface as an entry selected from the group including file transport protocol (FTP), HTTP, and SHTTP entries.

38. The system of claim 37 further comprising:
a plurality of Home Network endpoints registered with the TAD;
wherein the TAD includes a notification list cross-referencing website addresses with HN endpoints, the TAD sending website notifications via the Internet interface in response to cross-referencing HN endpoints.

39. The system of claim 37 wherein the TAD has an address and creates a hypertext link to the TAD address for requesting playback of the recorded message.

40. The system of claim 39 wherein the TAD converts the recorded message format to one selected from the group including MP3, WAV, WMA, and RA formats.

41. The system of claim 40 wherein the TAD converts the recorded voice mail message to a text message attachment.

42. The system of claim 30 wherein the gateway interfaces to an external telephone line; and,
wherein the TAD sends a voice-announcement via the gateway to an external telephone number.

43. The system of claim 42 further comprising:
a plurality of Home Network endpoints registered with the TAD;
wherein the TAD includes a notification list cross-referencing external telephone numbers with HN endpoints, the TAD sending voice-announcement to external telephone numbers in response to cross-referencing HN endpoints.

44. The system of claim 42 wherein the TAD accepts dual tone multi-frequency (DTMF) signals for requesting playback of a recorded message.

45. The system of claim 42 wherein the TAD converts the recorded message to an external telephone compatible format.

46. The system of claim 30 wherein the gateway interfaces a wireless telephone system; and,
wherein the TAD sends wireless telephone text messages via the gateway to wireless telephone numbers.

47. The system of claim 46 further comprising:
a plurality of Home Network endpoints registered with the TAD;
wherein the TAD includes a notification list cross-referencing wireless telephone numbers with HN endpoints, the TAD sending wireless telephone text messages to wireless telephone numbers in response to cross-referencing HN endpoints.

48. The system of claim 47 wherein the TAD records an audio voice message, converts the audio voice message to a text message, and sends the converted text message.

49. The system of claim 46 wherein the TAD accepts dual tone multi-frequency (DTMF) signals for requesting playback of the recorded message.

50. The system of claim 46 wherein the TAD converts the recorded message to a wireless telephone compatible format.

51. A method for a Home Network telephone answering device (TAD) to notify external systems of voice mail messages, the method comprising:
establishing a Home Network system including a notification list cross-referencing notification addresses with incoming telephone numbers;
recording a voice mail message on a Home Network TAD, for registered Home Network endpoints; and,
sending a notification of the recorded message from the TAD to a system external to the Home Network in response to the incoming telephone number.

* * * * *